United States Patent
Zhou et al.

(10) Patent No.: US 9,959,626 B2
(45) Date of Patent: May 1, 2018

(54) THREE-DIMENSIONAL DEPTH PERCEPTION METHOD AND APPARATUS WITH AN ADJUSTABLE WORKING RANGE

(71) Applicants: Yanhui Zhou, Xi'an (CN); Chenyang Ge, Xi'an (CN)

(72) Inventors: Yanhui Zhou, Xi'an (CN); Chenyang Ge, Xi'an (CN)

(*) Notice: Subject to any disclaimer, the term of this patent is extended or adjusted under 35 U.S.C. 154(b) by 299 days.

(21) Appl. No.: 15/048,296

(22) Filed: Feb. 19, 2016

(65) Prior Publication Data
US 2017/0054962 A1    Feb. 23, 2017

(30) Foreign Application Priority Data
Aug. 18, 2015 (CN) .......... 2015 1 0508161 6

(51) Int. Cl.
  *G06T 11/00* (2006.01)
  *G06T 7/00* (2017.01)
  *G01B 11/25* (2006.01)
  *G06T 7/521* (2017.01)

(52) U.S. Cl.
  CPC ........ *G06T 7/0057* (2013.01); *G01B 11/2513* (2013.01); *G06T 7/521* (2017.01); *G06T 2207/10028* (2013.01)

(58) Field of Classification Search
  CPC .......... G06T 7/521; G06T 2207/10028; G01B 11/2513
  USPC .......................................................... 348/46
  See application file for complete search history.

(56) References Cited

U.S. PATENT DOCUMENTS

2002/0195496 A1*  12/2002  Tsikos ............... G06F 17/30879
                                                            235/462.01
2004/0105580 A1*   6/2004  Hager ...................... G06K 9/32
                                                                382/154

* cited by examiner

*Primary Examiner* — Jeffery Williams
(74) *Attorney, Agent, or Firm* — Birch, Stewart, Kolasch & Birch, LLP (57) ABSTRACT

The present invention discloses a three-dimensional depth perception method and apparatus with an adjustable working range. The method comprises: setting a working range mode from the external or by an adaptive adjustment, projecting encoded patterns into a corresponding working range by adjusting a driving current of a laser pattern projector driving circuit, adjusting a receiving camera focal length and a baseline distance, collecting a sequence of projected encoded images and feeding them into a depth perception module that adjusts control parameters for image preprocessing based on the working range mode, selecting, from a group of reference encoded images in coincidence with the working range mode to perform block-matching-based disparity computation and depth computation to the inputted encoded image sequence, and outputting a depth image sequence. A three-dimensional depth perception apparatus with an adjustable working range is implemented based on the method. The apparatus facilitates optimization and real-time implementation of the depth perception computation method and makes it adapted to different working ranges, thereby breaking through application limits of the existing three-dimensional depth perception apparatuses.

12 Claims, 3 Drawing Sheets

Fig.3

THREE-DIMENSIONAL DEPTH PERCEPTION METHOD AND APPARATUS WITH AN ADJUSTABLE WORKING RANGE

FIELD OF THE INVENTION

The present disclosure relates to technical fields of image processing, natural interaction, and integrated circuit, and more specifically, to a three-dimensional depth perception method and apparatus with an adjustable working range.

BACKGROUND OF THE INVENTION

A natural and harmonious human-machine interaction manner is an ideal objective of human beings in manipulating machines, which enables a machine to understand a command transmitted by people in a natural state. A depth perception technology, as a core technology for human-machine natural interaction, has a wide application prospect in fields such as machine vision, intelligent monitoring, 3D rebuilding, somatosensory interaction, 3D printing, unmanned aerial vehicles, etc. A structured light-based active visual mode may obtain depth information of an image in a relatively accurate manner, e.g., projecting, with infrared laser, images of a fixed mode onto a surface of an object so as to encode the surface, collecting, by an image sensor, infrared encoded images, and then calculating depth information of the object through depth perception. The generated depth information may be used for real-time identifying a three-dimensional image and capturing actions, so as to make it possible for people to interact with a terminal through natural manners like expressions, gestures, and somatosensory actions. Compared with ToF (Time of Flight), the structured-light encoded three-dimensional depth perception technology has certain advantages in cost and performance.

The existing three-dimensional depth perception devices, for example, the first generation (based on PrimeSense structured-light module) and second generation (based on ToF module) of Microsoft Kinect, have a working range between about 0.6 and 5 meters, mainly for somatosensory action identification with a certain distance, e.g., home entertainment; the RealSense 3D depth camera by Intel has a working range between about 0.2~2 meters, for near-range identification of gesture actions and human-face expressions. These existing three-dimensional depth perception apparatuses cannot realize an adjustable working range, i.e., with a same set of apparatus, not only a near-range gesture or human face can be identified, but also somatosensory actions at a distance of several meters away can be identified, and even pedestrians at a farther distance (e.g., 10 meters away) can be tracked and identified.

SUMMARY OF THE INVENTION

In view of the above, the present invention provides a three-dimensional depth perception method and apparatus with an adjustable working range. The method comprises: setting a working range mode from the external or by an adaptive adjustment, adjusting a driving current and an output power of a laser pattern projector driving circuit, adjusting a focal length of a receiving camera and a baseline distance, and then adjusting, by a depth perception module, control parameters of image pre-processing, selecting to output, from multiple groups of reference encoded images that have been solidified in a memory, one group of reference encoded images in coincidence with the working range mode, performing block-matching-based disparity computation and depth computation to an input encoded image sequence, and outputting a depth image sequence. An apparatus designed based on the method may achieve that a same set of three-dimensional depth perception apparatus can obtain high-resolution, high-accuracy depth information within different working distance ranges.

In order to achieve the above inventive objective, a three-dimensional depth perception method with an adjustable working range is provided, the method being applied to a three-dimensional depth perception apparatus, the apparatus comprising: a laser pattern projector driving circuit, a laser pattern projector, a receiving camera, a depth perception module, a control module, and a memory; the method comprising steps of:

presetting or re-setting a working range mode of the apparatus by disposing the control module on the apparatus, parameters of the working range mode being stored by disposing a register in the apparatus;

transmitting, by the control module, control commands to a laser pattern projector driving circuit, the receiving camera, and the depth perception module, respectively, based on the parameters of the preset or re-set working range mode, wherein a control command transmitted to the laser pattern projector driving circuit is for adjusting a driving current and an output power of the laser pattern projector driving circuit, projecting an encoded pattern to a target object or space through a laser pattern projector, the target object or space being within a working range corresponding to the parameters of the working range mode;

a control command transmitted to the receiving camera is for adjusting a focal length of the receiving camera and a baseline distance, collecting encoded images generated by the laser pattern projector at a certain frame frequency so as to generate an input encoded image sequence that is fed into the depth perception module; the receiving camera is for receiving encoded patterns projected by the laser pattern projector within a specific wavelength range, comprising an image sensing device including an optical focusing imaging lens unit and a filtering unit; the baseline distance refers to a horizontal distance between the laser pattern projector and the receiving camera, central optical axes of the laser pattern projector and the receiving camera being parallel;

a control command transmitted to the depth perception module is for adjusting control parameters for pre-processing images, such that the input encoded image sequence is subjected to consistent processing after being pre-processed; and for selecting to output one group of reference encoded images in coincidence with the working range mode from among multiple groups of reference encoded images that have been solidified in the memory, the pre-processed input encoded image sequence being subjected to block-matching-based disparity computation and depth computation, thereby outputting a depth image sequence;

the multiple groups of reference encoded images refer to encoded images, in conjunction with different work range modes, each of which is projected onto a vertical plane vertical to a projector optical axis at a different distance, pre-collected, and subjected to a same image pre-processing as the input encoded images, the encoded images being pre-solidified in the memory as standard reference encoded images; the parameter $M_i$ for each working range mode corresponding to a group of reference encoded images with a distance $d_i$; wherein one group of reference encoded images may consist of one or more images, where i denotes the $i^{th}$ group;

The block-matching-based disparity computation resolves a displacement amount between an image block and an optimal matching block in the inputted encoded image by performing block matching similarity comparison between respective input encoded images in the pre-processed input encoded image sequence and the reference encoded images;

the depth computation: assume a focal length f of the receiving camera, a physical pixel pitch µ of the receiving camera image sensor, a baseline distance S between the laser pattern projector and the receiving camera, a displacement amount Δm resulting from the block-matching-based disparity computation, the Δm being Δx or Δy, a known distance $d_i$ corresponding to the reference encoded image, the corresponding depth value d' may be derived through an equation below for depth computation:

$$d' = d_i - \frac{\Delta m \mu d_i^2}{fS + \Delta m \mu d_i} = \frac{fSd_i}{fS + \Delta m \mu d_i}$$

A three-dimensional depth perception apparatus with an adjustable working range designed based on the above method comprises a laser pattern projector driving circuit, a laser pattern projector, a receiving camera, a depth perception module, a control module, and a memory; characterized in that:

the control module is configured to set or re-set a working range mode of the apparatus, parameters of the working range mode being stored by disposing a register in the original apparatus;

the control module is configured to transmit control commands to the laser pattern projector driving circuit, the receiving camera, and the depth perception module, respectively, based on the parameters of the preset or re-set working range mode; wherein a control command transmitted to the laser pattern projector driving circuit is for adjusting a driving current and an output power of the laser pattern projector driving circuit, projecting an encoded pattern to a target object or space within the set working range;

a control command transmitted to the receiving camera is for adjusting a focal length of the receiving camera and a baseline distance, collecting encoded images generated by the laser pattern projector at a certain frame frequency so as to generate an input encoded image sequence that is fed into the depth perception module; the receiving camera is for receiving encoded patterns projected by the laser pattern projector within a specific wavelength range, comprising an image sensing device including an optical focusing imaging lens unit and a filtering unit; the baseline distance refers to a horizontal distance between the laser pattern projector and the receiving camera, central optical axes of the laser pattern projector and the receiving camera being parallel;

a control command transmitted to the depth perception module is for adjusting control parameters for pre-processing images, such that the input encoded image sequence being subjected to consistent processing after being pre-processed; and for selecting to output one group of reference encoded images in coincidence with the working range mode from among multiple groups of reference encoded images that have been solidified in the memory, the pre-processed input encoded image sequence being subjected to block-matching-based disparity computation and depth computation, thereby outputting a depth image sequence;

the multiple groups of reference encoded images refer to encoded images, in conjunction with different work range modes, each of which is projected onto a vertical plane vertical to a projector optical axis at a different distance, pre-collected, and subjected to a same image pre-processing as the input encoded images, the encoded images being pre-solidified in the memory as standard reference encoded images; the parameter $M_i$ for each working range mode corresponding to a group of reference encoded images with a distance $d_i$; wherein one group of reference encoded images may consist of one or more images;

The block-matching-based disparity computation resolves a displacement amount between an image block and an optimal matching block in the inputted encoded image by performing block matching similarity comparison between respective input encoded images in the pre-processed input encoded image sequence and the reference encoded images;

the depth computation: assume a focal length f of the receiving camera, a physical pixel pitch µ of the receiving camera image sensor, a baseline distance S between the laser pattern projector and the receiving camera, a displacement amount Δm resulting from the block-matching-based disparity computation, the Δm being Δx or Δy, a known distance $d_i$ corresponding to the reference encoded image, the corresponding depth value d' may be derived through an equation below for depth computation:

$$d' = d_i - \frac{\Delta m \mu d_i^2}{fS + \Delta m \mu d_i} = \frac{fSd_i}{fS + \Delta m \mu d_i}$$

By adjusting the driving current of the laser pattern projector driving circuit, adjusting a focal length f of the receiving camera and the baseline distance S between the laser pattern projector and the receiving camera, and adjusting the control parameters for image pre-processing, in conjunction with multiple groups of reference encoded images at a given distance, the method above of the present invention may generate high-resolution high-precision depth information within different target distances, which facilitates obtaining the depth information using an image processing technology so as to identify a three-dimensional image and capture actions. The apparatus implemented based on the method is implemented in a manner of performing the functions of the method by hardware, which will facilitate optimization and real-time implementation of the depth perception computation method so as to make it suitable for different working ranges.

BRIEF DESCRIPTION OF THE PREFERRED EMBODIMENTS

DETAILED DESCRIPTION OF THE PREFERRED EMBODIMENTS

In one embodiment, there is provided a three-dimensional depth perception method with an adjustable working range, the method being applied to a three-dimensional depth perception apparatus, the apparatus comprising: a laser pattern projector driving circuit, a laser pattern projector, a receiving camera, a depth perception module, a control module, and a memory; the method comprising:

presetting or re-setting a working range mode of the apparatus by disposing the control module on the apparatus, parameters of the working range mode being stored by disposing a register in the apparatus;

transmitting, by the control module, control commands to a laser pattern projector driving circuit, the receiving camera, and the depth perception module, respectively, based on the parameters of the preset or re-set working range mode, wherein;

a control command transmitted to the laser pattern projector driving circuit is for adjusting a driving current and an output power of the laser pattern projector driving circuit, projecting an encoded pattern to a target object or space through a laser pattern projector, the target object or space being within a working range corresponding to the parameters of the working range mode;

a control command transmitted to the receiving camera is for adjusting a focal length of the receiving camera and a baseline distance, collecting encoded images generated by the laser pattern projector at a certain frame frequency so as to generate an input encoded image sequence that is fed into the depth perception module; the receiving camera is for receiving encoded patterns projected by the laser pattern projector within a specific wavelength range, comprising an image sensing device including an optical focusing imaging lens unit and a filtering unit; the baseline distance refers to a horizontal distance between the laser pattern projector and the receiving camera, central optical axes of the laser pattern projector and the receiving camera being parallel;

a control command transmitted to the depth perception module is for adjusting control parameters for pre-processing images, such that the input encoded image sequence being subjected to consistent processing after being pre-processed; and for selecting to output one group of reference encoded images in coincidence with the working range mode from among multiple groups of reference encoded images that have been solidified in the memory, the pre-processed input encoded image sequence being subjected to block-matching-based disparity computation and depth computation, thereby outputting a depth image sequence;

the multiple groups of reference encoded images refer to encoded images, in conjunction with different work range modes, each of which is projected onto a vertical plane vertical to a projector optical axis at a different distance, pre-collected, and subjected to a same image pre-processing as the input encoded images, the encoded images being pre-solidified in the memory as standard reference encoded images; the parameter $M_i$ for each working range mode corresponding to a group of reference encoded images with a distance $d_i$; wherein one group of reference encoded images may consist of one or more images, where i denotes the $i^{th}$ group;

The block-matching-based disparity computation resolves a displacement amount between an image block and an optimal matching block in the inputted encoded image by performing block matching similarity comparison between respective input encoded images in the pre-processed input encoded image sequence and the reference encoded images;

the depth computation: assume a focal length f of the receiving camera, a physical pixel pitch μ of the receiving camera image sensor, a baseline distance S between the laser pattern projector and the receiving camera, a displacement amount Δm resulting from the block-matching-based disparity computation, the Δm being Δx or Δy, a known distance $d_i$ corresponding to the reference encoded image, the corresponding depth value d' may be derived through an equation below for depth computation:

$$d' = d_i - \frac{\Delta m \mu d_i^2}{fS + \Delta m \mu d_i} = \frac{fSd_i}{fS + \Delta m \mu d_i}$$

In this embodiment, the working range mode is set by a control module, a driving current and an output power of the laser pattern projector driving circuit are adjusted based on the mode, and an encoded pattern is projected by a laser pattern projector onto a target object or space within the working range; the receiving camera collects the projected encoded image sequence and feeds it into the depth perception module; the depth perception module adjusts the control parameters for image pre-processing based on the working range mode, selects a group of reference encoded images in coincidence with the working range mode from among multiple groups of reference encoded images, performs block-matching-based disparity computation and depth computation to the input encoded image sequence, and outputs a depth image sequence.

Wherein, the laser pattern projector is a laser-encoded pattern transmitting device. The projected pattern may be fixed or may be changed through programming; its transmission may be synchronously controlled with collection of encoded images in the receiver camera; the projected pattern has a certain horizontal vertical viewing angle FoV; the laser light source may be visible light, infrared, UV, X-ray.

The laser pattern projector driving circuit may regulate the driving current to change the output power, so as to control a light intensity and a projection distance range for projection by the laser pattern projector onto the target object or space.

The receiving camera is for receiving encoded patterns within a specific wavelength range projected by the laser pattern projector, comprising an image sensing module that includes an optical focusing imaging lens unit and a filtering unit; the receiver camera focal length and the baseline distance are regulated based on the set working range mode; the encoded images generated by the laser pattern projector are collected at a certain frame frequency to generate an input encoded image sequence that is fed into a depth perception module; following change of the working range mode, the receiving camera may regulate different focal lengths and different baseline distances, or may keep the parameters of the focal length and baseline distance unchanged. The baseline distance refers to a horizontal distance between the laser pattern projector and the receiving camera, central optical axes of the laser pattern projector and the receiving camera being parallel.

The depth perception module adjusts control parameters for image pre-processing based on the set working range mode such that the inputted encoded image sequence is subjected to consistency processing after being pre-processed; a group of reference encoded images in coincidence with the working range mode are selected and outputted from among multiple groups of reference encoded images that have been solidified in a memory, the pre-processed input encoded image sequence is subjected to the block-matching-based disparity computation and depth computation, thereby outputting a depth image sequence; the memory is for solidifying multiple groups of reference encoded images at different distances, which is generally a non-volatile memory, e.g., Flash.

The image pre-processing comprises: for the input encoded image sequence or reference encoded image, performing input video format conversion, chromatic space conversion, grayscale image adaptive de-noising and enhancement, and grayscale image binaryzation processing, such that different images are subjected to consistency processing. Its intention is that through pre-processing the encoded image, a speckle pattern becomes much clearer with reduced noise interference, which facilitates the block-matching-based disparity computation in the present invention.

After the input encoded image sequence is processed by an image pre-processing sub-module, if it is used as a reference encoded image, it will be stored in the memory through a storage controller sub-module; if it is for depth calculation in conjunction with the stored reference encoded image, it will enter into the block-matching-based disparity calculation sub-module, while the reference encoded image for calculation enters into a block-matching-based disparity computation sub-module by being read by the storage controller; the visual disparity image represented by an offset amount calculated by the block-matching-based disparity calculation sub-module further enters into a depth computation sub-module for depth computation, finally outputting a depth image sequence.

The multiple groups of reference encoded images refer to encoded images, in conjunction with different work range modes, each of which is projected onto a vertical plane vertical to a projector optical axis at a different distance, pre-collected, and subjected to a same image pre-processing as the input encoded images, the encoded images being pre-solidified in the memory as standard reference encoded images; the parameter $M_i$ for each working range mode corresponding to a group of reference encoded images with a distance $d_i$; wherein one group of reference encoded images may consist of one or more images, where i denotes the $i^{th}$ group. Further, when performing depth calculation, different working range modes $M_i$ correspond to different known distances $d_i$ of different groups of reference encoded images.

Further, the group of reference encoded images may be a group of encoded images resulting in such a manner that a laser pattern projector projects a laser beam of a fixed pattern (infrared, invisible light, UV, visible light) onto a plane that is vertical to a central axis (Z axis) of the laser pattern projector or fixedly angled with a central axis of the laser pattern projector and has a known vertical distance $d_i$ (the plane may consist of a projection screen fabric, a panel, and the like, for presenting clear and stable laser images; the plane may be referred to as a reference plane), and then the group of encoded images are collected by the receiving camera under different temperatures and humidity. Generally, the laser pattern projector is parallel to an optical axis of the receiving camera with a baseline distance of S. After the same group of reference encoded images are subjected to the same image pre-processing as the inputted encoded image sequence, a matching reference pattern as an inputted encoded image sequence for performing visual disparity calculation may consist of one or more laser encoded images at the same distance.

The block-matching-based disparity computation resolves a displacement amount, i.e., disparity value, between an image block and an optimal matching block in the inputted encoded image by performing block matching similarity comparison between respective input encoded images in the pre-processed input encoded image sequence and the reference encoded images.

the depth computation: assume a focal length f of the receiving camera, a physical pixel pitch μ of the receiving camera image sensor, a base line distance S between the laser pattern projector and the receiving camera, a displacement amount Δm resulting from the block-matching-based disparity computation, the Δm being Δx or Δy, a known distance $d_i$ corresponding to the reference encoded image, the corresponding depth value d' may be derived through an equation below for depth computation:

$$d' = d_i - \frac{\Delta m \mu d_i^2}{fS + \Delta m \mu d_i} = \frac{fSd_i}{fS + \Delta m \mu d_i}$$

Therefore, by adding a control module to adjust the driving current of the laser pattern projector driving circuit based on the working range mode, adjusting a focal length f of the receiving camera and the baseline distance S between the laser pattern projector and the receiving camera, adjusting the control parameters for image pre-processing, and selecting a group of reference encoded images in coincidence with the working range mode in the memory, the method of the present invention may generate high-resolution high-precision depth information within different target distances, which facilitates obtaining the depth information with an image processing technology so as to identify the three-dimensional image and capture actions.

Figure 1:
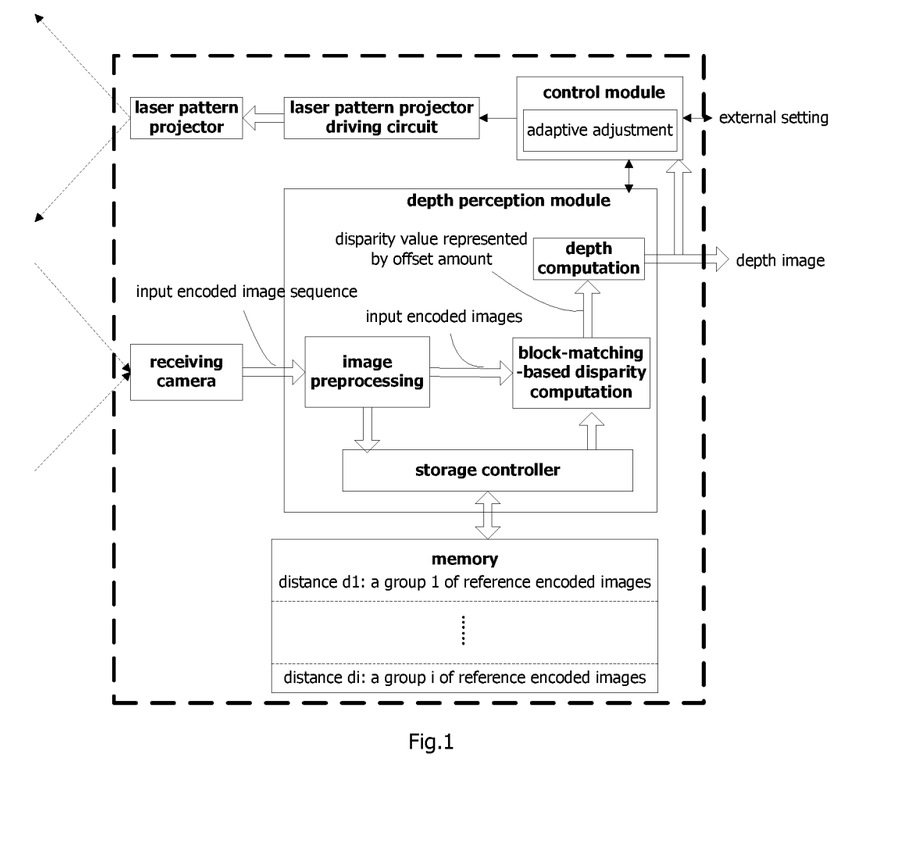
FIG. 1 shows a structural diagram of a three-dimensional depth perception apparatus with an adjustable working range according to an embodiment of the present invention.

The structural diagram of the three-dimensional depth perception apparatus with the added control module is shown in FIG. 1.

Figure 3:
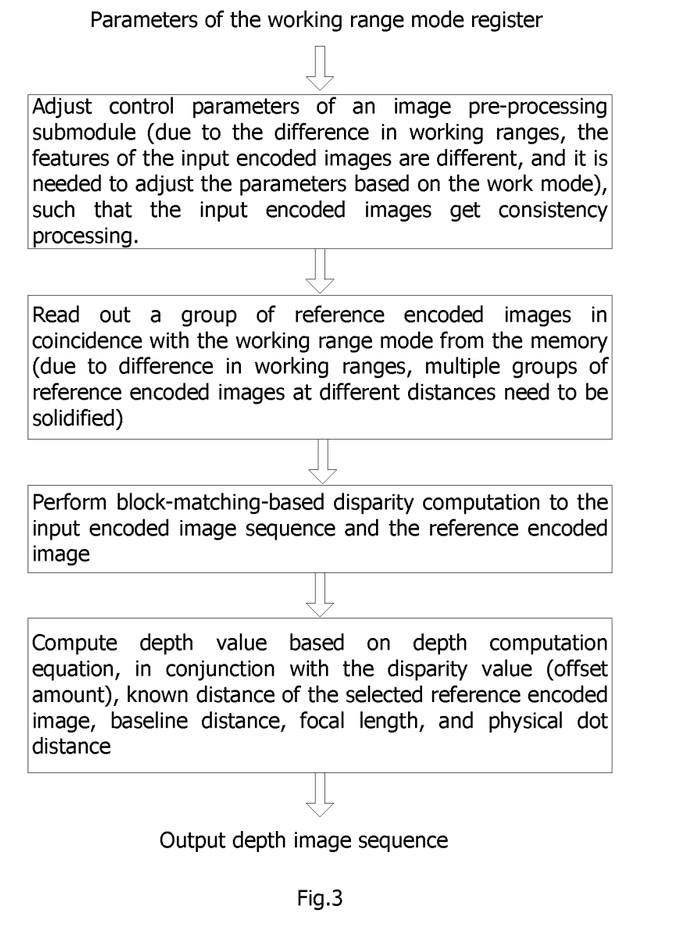
FIG. 3 shows a work flow diagram of a depth perception module based on a working range mode according to an embodiment of the present invention.

In one embodiment, the depth perception module is further divided, based on its processing functions, into an image pre-processing sub-module, a block-matching-based disparity computation sub-module, a storage controller sub-module, and a depth computation sub-module. Based on a register state value of the working range mode, the collected input encoded image sequence is subjected to image pre-processing that facilitates block-matching-based disparity computation, and in conjunction with a group of reference encoded images of a known distance which have been solidified in the memory, block-matching-based disparity computation and depth computation are performed, thereby finally outputting a depth image sequence. The specific flow is shown in FIG. 3.

In one embodiment, the control module comprises an external setting unit, the external setting unit setting the parameters of the working range mode for the control module using an external microprocessor through a bus protocol, and then the control module setting other parameter values.

When the working range mode is set through an external setting unit, first, a driving current of the laser pattern projector driving circuit is first adjusted, such that the projected encoded pattern can work within the set working range; next, a focal length f of the receiver camera and the baseline distance S between the laser pattern projector and the receiver camera are adjusted based on the working range mode; and then, the control parameters for image pre-processing are adjusted by the depth perception module based on the working range mode, and a group of reference encoded images in coincidence with the working range mode are selected and outputted from multiple groups of the reference encoded images that have been solidified in the memory, such that high-resolution high-accuracy depth information may be obtained under different working range modes through the control module.

In one embodiment, the control module comprises an adaptive adjustment unit that automatically detects a target object based on the generated depth image and automatically adjusts the parameters of the working range mode based on from-far-to-near change of the target object. In this way, once the target object is detected, the working range mode may be automatically adjusted based on from-far-to-near of the target object, e.g., the target object is now in a range of a super far distance work mode M3; with movement, once it is detected through a depth image that the target object enters in the working range of a far distance work mode M2, the control module adaptively switches the working range mode, and issues corresponding instructions to the drive circuit and the depth perception module, such that the entire apparatus works in the far distance work mode M2.

When the working range mode is set by the adaptive adjustment unit, the target is automatically detected based on the generated depth image, and parameter values associated with the working range mode are automatically set based on far-near change of the target. Use of this manner needs automatically detecting a distance interval of the target based on the generated depth image, which is suitable for a specific target or a moving target. Automatic adjustment is enabled with far-near change of the target; for example, once a person is detected, parameter values associated with distance may be automatically adjusted with from-far-to-near of the person.

In one embodiment, it is optional that the external setting unit or adaptive adjustment unit individually exists in the control module; in another embodiment, the control module includes both of the external setting unit and the adaptive adjustment unit. The external setting unit or adaptive adjustment unit makes the entire apparatus work within different distance intervals by controlling parameters, which are associated with the working range, of the driving circuit of the laser pattern projector and the depth perception module.

Figure 2:
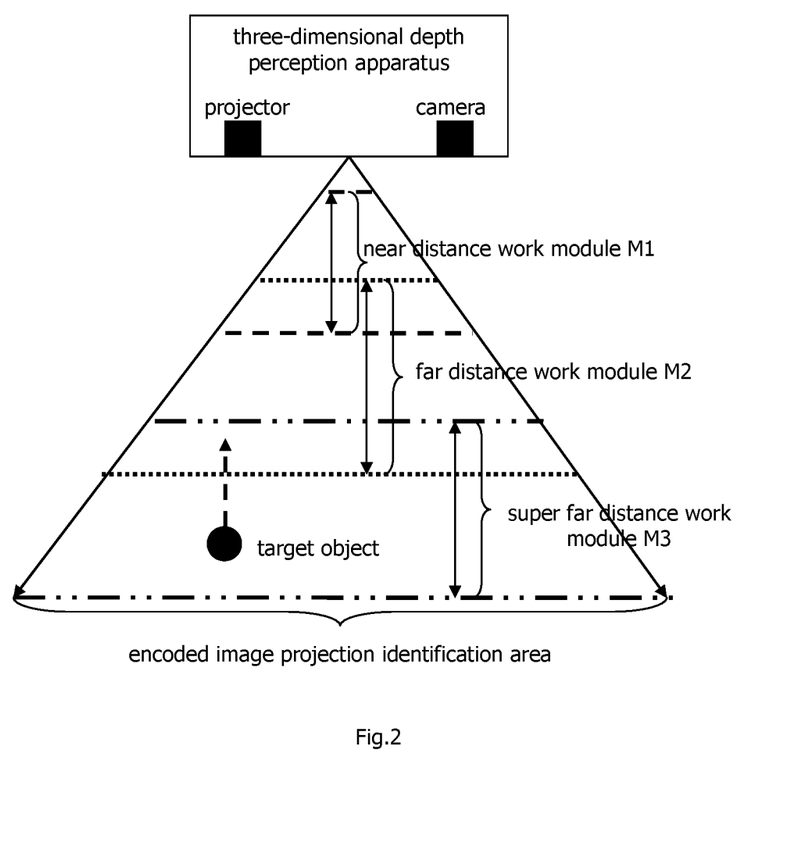
FIG. 2 shows a schematic diagram of adaptively adjusting the working range according to an embodiment of the present invention.

In one embodiment, the method further defines a specific content of the working range mode, namely: the working range mode is divided into a plurality of distance intervals based on a far-near distance of the target object, parameters of each working range mode corresponding to a specific distance interval. FIG. 2 shows one kind of classification of the working range mode: dividing the working range mode into a near distance work mode M1, a far distance work mode M2, and a super far distance work mode M3. Then, parameters of the working range mode are stored, i.e., the working range mode may be represented by setting a register status value, e.g., the near distance mode corresponds to a status value 00, the far distance mode corresponds to 01, and the super far distance mode corresponds to 02.

In one embodiment, the adaptive adjustment unit may automatically detect a specific target or a moving target within a working range, and automatically set parameters of the corresponding working range mode dependent on far-near change of the target. In this manner, once the target object is detected, the working range mode may be automatically adjusted with from-far-to-near of the target object, e.g., the target object is now in a range of the super far distance work mode M3; with the movement, once it is detected through the depth image that the target object enters into the working range of the far distance work mode M2, the control module adaptively switches the working range mode and issues corresponding instructions to the driving circuit and the depth perception module, such that the entire apparatus works in the far distance work mode M2.

In one embodiment, the method provides a manner of changing a driving current of the laser pattern projector driving circuit, namely: the manner of adjusting the driving current of the laser pattern projector driving circuit includes adjusting the current magnitude of a constant current driving manner by changing a resistance value of a digital localizer or a variable resistor; the farther the distance corresponding to the working range parameter is, the larger the driving current is, while the smaller its corresponding resistance value is.

Because a laser source of the laser pattern projector generally uses LED, whose driving circuit adopts a constant driving manner, the driving circuit may adopt a conventional LED driving circuit and the magnitude of the driving current is adjusted by changing the resistance value of the digital locator or variable resistor; generally, the farther the working range is, the larger the driving current is, while the smaller its corresponding resistance value is.

Based on the method, in one embodiment, a three-dimensional depth perception apparatus with an adjustable working range is provided, the apparatus comprising a laser pattern projector driving circuit, a laser pattern projector, a receiving camera, a depth perception module, a control module, and a memory; characterized in that, the control module is configured to set or re-set a working range mode of the apparatus, parameters of the working range mode being stored by disposing a register in the original apparatus;

The control module transmits control commands to the laser pattern projector driving circuit, the receiving camera, and the depth perception module based on parameters of the preset or reset working range mode, respectively; wherein a control command transmitted to the laser pattern projector driving circuit is for adjusting a driving current and an output power of the laser pattern projector driving circuit, projecting an encoded pattern to a target object or space within the set working range;

a control command transmitted to the receiving camera is for adjusting a focal length of the receiving camera and a baseline distance, collecting encoded images generated by the laser pattern projector at a certain frame frequency so as to generate an input encoded image sequence that is fed into the depth perception module; the receiving camera is for receiving encoded patterns projected by the laser pattern projector within a specific wavelength range, comprising an image sensing device including an optical focusing imaging lens unit and a filtering unit; the baseline distance refers to a horizontal distance between the laser pattern projector and the receiving camera, central optical axes of the laser pattern projector and the receiving camera being parallel;

a control command transmitted to the depth perception module is for adjusting control parameters for pre-processing images, such that the input encoded image sequence being subjected to consistent processing after being pre-processed; and for selecting to output one group of reference encoded images in coincidence with the working range mode from among multiple groups of reference encoded images that have been solidified in the memory, the pre-processed input encoded image sequence being subjected to block-matching-based disparity computation and depth computation, thereby outputting a depth image sequence;

the multiple groups of reference encoded images refer to encoded images, in conjunction with different work range modes, each of which is projected onto a vertical plane vertical to a projector optical axis at a different distance, pre-collected, and subjected to a same image pre-processing as the input encoded images, the encoded images being pre-solidified in the memory as standard reference encoded images; the parameter $M_i$ for each working range mode corresponding to a group of reference encoded images with a distance $d_i$; wherein one group of reference encoded images may consist of one or more images. Further, when performing depth calculation, different working range modes $M_i$ correspond to different known distances $d_i$ of different groups of reference encoded images.

The block-matching-based disparity computation resolves a displacement amount, i.e., disparity value, between an image block and an optimal matching block in the inputted encoded image by performing block matching similarity comparison between respective input encoded images in the pre-processed input encoded image sequence and the reference encoded images;

the depth computation: assume a focal length f of the receiving camera, a physical pixel pitch µ of the receiving camera image sensor, a base line distance S between the laser pattern projector and the receiving camera, a displacement amount Δm resulting from the block-matching-based disparity computation, the Δm being Δx or Δy, a known distance $d_i$ corresponding to the reference encoded image, the corresponding depth value d' may be derived through an equation below for depth computation:

$$d' = d_i - \frac{\Delta m \mu d_i^2}{fS + \Delta m \mu d_i} = \frac{fSd_i}{fS + \Delta m \mu d_i}$$

In this embodiment, the working range mode is set by a control module. The driving current and output power of the laser pattern projector driving circuit are adjusted based on the mode, and the encoded images are projected by a laser pattern projector onto a target object or space within the working range; the receiving camera collects a sequence of the projected encoded image and feeds them into the depth perception module; the depth perception module adjusts the control parameters for image pre-processing based on the working range mode, selects a group of reference encoded images in coincidence with the working range mode from among multiple groups of reference encoded images, performs block-matching-based disparity computation and depth computation to the input encoded image sequence, thereby outputting a depth image sequence.

Wherein, the laser pattern projector is a laser-encoded pattern transmitting device. The projected pattern may be fixed or may be changed by programming; its transmission may be controlled in synchronization with collecting encoded images by the receiver camera; the projected pattern has a certain horizontal-vertical viewing angle FoV; the laser light source may be visible light, infrared, UV, X-ray.

The laser pattern projector driving circuit may regulate the driving current to change the output power, so as to control a light intensity and a projection distance range for projection by the laser pattern projector onto the target object or space.

The receiving camera is for receiving encoded patterns within a specific wavelength range projected by the laser pattern projector, comprising an image sensing module that includes an optical focusing imaging lens unit and a filtering unit; based on the working range mode as set, the receiver camera focal length and the baseline distance are regulated; the encoded images generated by the laser pattern projector are collected at a certain frame frequency to generate an input encoded image sequence that is fed into the depth perception module; following change of the working range mode, the receiving camera may regulate different focal lengths and different baseline distances, or may keep the parameters of the focal length and baseline distance unchanged. The baseline distance refers to a horizontal distance between the laser pattern projector and the receiving camera, central optical axes of the laser pattern projector and the receiving camera being parallel.

The depth perception module adjusts control parameters for image pre-processing based on the set working range mode such that the inputted encoded image sequence is subjected to a consistency processing after being pre-processed; a group of reference encoded images in coincidence with the working range mode are selected and outputted from among multiple groups of reference encoded images that have been solidified in a memory, the pre-processed input encoded image sequence is subjected to the block-matching-based disparity computation and depth computation, thereby outputting a depth image sequence; the memory is for solidifying multiple groups of reference encoded images at different distances, which is generally a non-volatile memory, e.g., Flash.

The image pre-processing comprises: for the input encoded image sequence or reference encoded image, performing input video format conversion, chromatic space conversion, grayscale image adaptive de-noising and enhancement, and grayscale image binaryzation processing, such that different images are subjected to consistency processing. Its intention is that through pre-processing of the encoded image, the speckle pattern becomes much clearer with reduced noise interference, which facilitates the block-matching-based disparity computation in the present invention.

After the input encoded image sequence is processed by an image pre-processing sub-module, if it is used as a reference encoded image, it will be stored in the memory through a storage controller sub-module; if it is for depth calculation in conjunction with the stored reference encoded image, it will enter into the block-matching-based disparity calculation sub-module, while the reference encoded image for calculation enters into the block-matching-based disparity computation sub-module by being read by the storage controller; the visual disparity image represented by an offset amount calculated by the block-matching-based disparity calculation sub-module further enters into a depth computation sub-module for depth computation, finally outputting a depth image sequence.

The multiple groups of reference encoded images refer to encoded images, in conjunction with different work range modes, each of which is projected onto a vertical plane vertical to a projector optical axis at a different distance, pre-collected, and subjected to a same image pre-processing as the input encoded images, the encoded images being pre-solidified in the memory as standard reference encoded images; the parameter $M_i$ for each working range mode corresponding to a group of reference encoded images with a distance $d_i$; wherein one group of reference encoded images may consist of one or more images, where i denotes the $i^{th}$ group. Further, when performing depth calculation, different working range modes $M_i$ correspond to different known distances $d_i$ of different groups of reference encoded images.

Further, the group of reference encoded images may be a group of encoded images resulting in such a manner that a laser pattern projector projects a laser beam of a fixed pattern (infrared, invisible light, UV, visible light) onto a plane that is vertical to a central axis (Z axis) of the laser pattern projector or fixedly angled with a central axis of the laser pattern projector and has a known vertical distance $d_i$ (the plane may consist of a projection screen fabric, a panel, and the like, for presenting clear and stable laser images; the plane may be referred to as a reference plane), and then the group of encoded images are collected by the receiving camera under different temperatures and humidity. Generally, the laser pattern projector is parallel to an optical axis of the receiving camera with a baseline distance S. After the same group of reference encoded images are subjected to the same image pre-processing as the inputted encoded image sequence, a matching reference pattern as an inputted encoded image sequence for performing visual disparity calculation may consist of one or more laser encoded images at the same distance.

The block-matching-based disparity computation resolves a displacement amount, i.e., disparity value, between an image block and an optimal matching block in the inputted encoded image by performing block matching similarity comparison between respective input encoded images in the pre-processed input encoded image sequence and the reference encoded images.

the depth computation: assume a focal length f of the receiving camera, a physical pixel pitch μ of the receiving camera image sensor, a base line distance S between the laser pattern projector and the receiving camera, a displacement amount Δm resulting from the block-matching-based disparity computation, the Δm being Δx or Δy, a known distance $d_i$ corresponding to the reference encoded image, the corresponding depth value d' may be derived through an equation below for depth computation:

$$d' = d_i - \frac{\Delta m \mu d_i^2}{fS + \Delta m \mu d_i} = \frac{fSd_i}{fS + \Delta m \mu d_i}$$

in view of the above, by adjusting the driving current of the laser pattern projector driving circuit by a control module based on the working range mode, adjusting the focal length f of the receiving camera and the baseline distance S between the laser pattern projector and the receiving camera, adjusting the control parameters for image pre-processing, and selecting a group of reference encoded images in coincidence with the working range mode in the memory, the apparatus provided in the embodiment may generate high-resolution high-precision depth information within different target distances, which facilitates obtaining the depth information through an image processing technology so as to identify the three-dimensional image and capture actions. The structural diagram of the three-dimensional depth sensing apparatus in the present embodiment is shown in FIG. 1.

In one embodiment, the depth perception module is further divided, based on its processing functions, into an image pre-processing sub-module, a block-matching-based disparity computation sub-module, a storage controller sub-module, and a depth computation sub-module. Based on a register state value of the working range mode, the collected input encoded image sequence is subjected to image pre-processing that facilitates the block-matching-based disparity computation, and in conjunction with a group of reference encoded images of a known distance which have been solidified in the memory, block-matching-based disparity computation and depth computation are performed, thereby finally outputting a depth image sequence. The specific flow is shown in FIG. 3.

In one embodiment, the control module comprises an external setting unit, the external setting unit setting the parameters of the working range mode for the control module using an external microprocessor through a bus protocol, and then the control module setting other parameter values.

When the working range mode is set through an external setting unit, first, a driving current of the laser pattern projector driving circuit is first adjusted, such that the projected encoded pattern can work within the set working range; next, a focal length f of the receiver camera and the baseline distance S between the laser pattern projector and the receiver camera are adjusted based on the working range mode; and then, the control parameters for image pre-processing are adjusted by the depth perception module based on the working range mode, and a group of reference encoded images in coincidence with the working range mode are selected and outputted from multiple groups of the reference encoded images that have been solidified in the memory, such that high-resolution high-accuracy depth information may be obtained under different working range modes through the control module.

In one embodiment, the control module comprises an adaptive adjustment unit that automatically detects a target object based on the generated depth image and automatically adjusts the parameters of the working range mode based on from-far-to-near change of the target object. In this way, once the target object is detected, the working range mode may be automatically adjusted based on from-far-to-near of the target object, e.g., the target object is now in a range of a super far distance work mode M3; with movement, once it is detected through a depth image that the target object enters in the working range of a far distance work mode M2, the control module adaptively switches the working range mode, and issues corresponding instructions to the drive circuit and the depth perception module, such that the entire apparatus works in the far distance work mode M2.

When the working range mode is set by the adaptive adjustment unit, the target is automatically detected based on the generated depth image, and parameter values associated with the working range mode are automatically set based on far-near change of the target. Use of this manner needs automatically detecting a distance interval of the target based on the generated depth image, which is suitable for a specific target or a moving target. Automatic adjustment is enabled with far-near change of the target; for example, once a person is detected, parameter values associated with distance may be automatically adjusted with from-far-to-near of the person.

In one embodiment, it is optional that the external setting unit or adaptive adjustment unit individually exists in the control module; in another embodiment, the control module includes both of the external setting unit and the adaptive adjustment unit. The external setting unit or adaptive adjustment unit makes the entire apparatus work within different distance intervals by controlling parameters, which are associated with the working range, of the driving circuit of the laser pattern projector and the depth perception module.

In one embodiment, the method further defines a specific content of the working range mode, namely: the working range mode is divided into a plurality of distance intervals based on a far-near distance of the target object, parameters of each working range mode corresponding to a specific distance interval. FIG. 2 shows one kind of classification of the working range mode: dividing the working range mode into a near distance work mode M1, a far distance work mode M2, and a super far distance work mode M3. Then, parameters of the working range mode are stored, i.e., the working range mode may be represented by setting a register status value, e.g., the near distance mode corresponds to a status value 00, the far distance mode corresponds to 01, and the super far distance mode corresponds to 02.

In one embodiment, the adaptive adjustment unit of the apparatus may automatically detect a specific target or a moving target within a working range, and automatically set parameters of the corresponding working range mode dependent on far-near change of the target. In this manner, once the target object is detected, the working range mode may be automatically adjusted with from-far-to-near of the target object, e.g., the target object is now in a range of the super far distance work mode M3; with the movement, once it is detected through the depth image that the target object enters into the working range of the far distance work mode M2, the control module adaptively switches the working range mode and issues corresponding instructions to the driving circuit and the depth perception module, such that the entire apparatus works in the far distance work mode M2.

In one embodiment, a manner of changing a driving current of the laser pattern projector driving circuit of the apparatus is provided, namely: the manner of adjusting the driving current of the laser pattern projector driving circuit includes adjusting the current magnitude of a constant current driving manner by changing a resistance value of a digital localizer or a variable resistor; the farther the distance corresponding to the working range parameter is, the larger the driving current is, while the smaller its corresponding resistance value is.

Because a laser source of the laser pattern projector generally uses LED, whose driving circuit adopts a constant driving manner, the driving circuit may adopt a conventional LED driving circuit and the magnitude of the driving current is adjusted by changing the resistance value of the digital locator or variable resistor; generally, the farther the working range is, the larger the driving current is, while the smaller its corresponding resistance value is.

By adjusting the driving current of the laser pattern projector driving circuit, adjusting a focal length f of the receiving camera, and the baseline distance S between the laser pattern projector and the receiving camera, and adjusting the control parameters for image pre-processing, in conjunction with multiple groups of reference encoded images at a given distance, the method of the present invention may generate high-resolution high-precision depth information within different target distances, which facilitates obtaining the depth information using an image processing technology so as to identify the three-dimensional image and capture actions. The apparatus implemented based on the method is implemented in a manner of performing the functions of the method by hardware, which will facilitate optimization and real-time implementation of the depth perception computation method so as to make it suitable for different working ranges.

Although the above embodiments are implemented in a specific image, they are not intended to limit the present invention; the present invention may be likewise applied to a similar structured light encoded image or other images; the reference encoded image for solidification may be 1 frame or more frames; when reading the image, multiple frames may also be read out simultaneously; the memory for storing the reference encoded image may be a serial-port flash or other memory.

The present invention has been introduced above in detail. In the present disclosure, specific examples are applied to illustrate the principle and embodiments of the present invention. Illustration of the embodiments is only for facilitating understanding of the method of the present invention; meanwhile, to those skilled in the art, based on the idea of the present invention, change may be made to the preferred embodiments and application scope. In view of the above, the content of the present description shall not be understood as limiting the present invention.

The invention claimed is:

1. A three-dimensional depth perception method with an adjustable working range, characterized in that:
   the method being applied to a three-dimensional depth perception apparatus, the apparatus comprising: a laser pattern projector driving circuit, a laser pattern projector, a receiving camera, a depth perception module, a control module, and a memory; the method comprising steps of:
   presetting or re-setting a working range mode of the apparatus by disposing the control module on the apparatus, parameters of the working range mode being stored by disposing the register in the apparatus; and
   transmitting, by the control module, control commands to a laser pattern projector driving circuit, the receiving camera, and the depth perception module, respectively, based on the parameters of the preset or re-set working range mode; wherein
   a control command transmitted to the laser pattern projector driving circuit is for adjusting a driving current and an output power of the laser pattern projector driving circuit, projecting an encoded pattern to a target object or space through a laser pattern projector, the target object or space being within a working range corresponding to the parameters of the working range mode;
   a control command transmitted to the receiving camera being for adjusting a focal length and a baseline distance of the receiving camera, collecting encoded images generated by the laser pattern projector at a certain frame frequency so as to generate an input encoded image sequence that is fed into the depth perception module; the receiving camera is for receiving encoded patterns projected by the laser pattern projector within a specific wavelength range, comprising an image sensing device including an optical focusing imaging lens unit and a filtering unit; the baseline distance referring to a horizontal distance between the laser pattern projector and the receiving camera, central optical axes of the laser pattern projector and the receiving camera being parallel;
   a control command transmitted to the depth perception module being for adjusting control parameters for pre-processing images, such that the input encoded image sequence being subjected to consistent processing after being pre-processed; and for selecting to output one group of reference encoded images in coincidence with the working range mode from among multiple groups of reference encoded images that have been solidified in the memory, the pre-processed input encoded image sequence being subjected to block-matching-based disparity computation and depth computation, thereby outputting a depth image sequence;
   the multiple groups of reference encoded images refer to encoded images, in conjunction with different work range modes, each of which is projected onto a vertical plane vertical to a projector optical axis at a different distance, pre-collected, and subjected to a same image pre-processing as the input encoded images, the encoded images being pre-solidified in the memory as standard reference encoded images; the parameter $M_i$ for each working range mode corresponding to a group of reference encoded images with a distance $d_i$; wherein one group of reference encoded images may consist of one or more images, where i denotes the i$^{th}$ group;

The block-matching-based disparity computation resolving a displacement amount between an image block and an optimal matching block in the inputted encoded image by performing block matching similarity comparison between respective input encoded images in the pre-processed input encoded image sequence and the reference encoded images;

the depth computation: assume a focal length f of the receiving camera, a physical pixel pitch μ of the receiving camera image sensor, a baseline distance S between the laser pattern projector and the receiving camera, a displacement amount Δm resulting from the block-matching-based disparity computation, the Δm being Δx or Δy, a known distance $d_i$ corresponding to the reference encoded image, the corresponding depth value d' may be derived through an equation below for depth computation:

$$d' = d_i - \frac{\Delta m \mu d_i^2}{fS + \Delta m \mu d_i} = \frac{fSd_i}{fS + \Delta m \mu d_i}.$$

2. The method according to claim 1, characterized in that: the control module comprises an external setting unit, the external setting unit setting the parameters of the working range mode for the control module using an external microprocessor through a bus protocol.

3. The method according to claim 1, characterized in that: the control module comprises an adaptive adjustment unit that automatically detects a target object based on the generated depth image and automatically adjusts the parameters of the working range mode based on far-near change of the target object.

4. The method according to claim 1, characterized in that: the working range mode is divided into a plurality of distance intervals based on far-near distance of the target object, parameters of each working range mode corresponding to a specific distance interval.

5. The method according to claim 1, characterized in that: the adjusting a driving current of the laser pattern projector driving circuit comprises a current magnitude of a constant current driving manner by changing a resistance value of a digital localizer or a variable resistor; the farther the distance corresponding to the working range parameter is, the larger the driving current is, while the smaller its corresponding resistance value is.

6. A three-dimensional depth perception apparatus with an adjustable working range, characterized in that:

the apparatus comprises: a laser pattern projector driving circuit, a laser pattern projector, a receiving camera, a depth perception module, a control module, and a memory;

the control module is configured to set or re-set a working range mode of the apparatus, parameters of the working range mode being stored by disposing the register in the apparatus;

the control module is configured to transmit control commands to the laser pattern projector driving circuit, the receiving camera, and the depth perception module, respectively, based on the parameters of the preset or re-set working range mode; wherein a control command transmitted to the laser pattern projector driving circuit is for adjusting a driving current and an output power of the laser pattern projector driving circuit, projecting an encoded pattern to a target object or space within the set working range;

a control command transmitted to the receiving camera is for adjusting a focal length and a baseline distance of the receiving camera, collecting encoded images generated by the laser pattern projector at a certain frame frequency so as to generate an input encoded image sequence that is fed into the depth perception module; the receiving camera is for receiving encoded patterns projected by the laser pattern projector within a specific wavelength range, comprising an image sensing device including an optical focusing imaging lens unit and a filtering unit; the baseline distance referring to a horizontal distance between the laser pattern projector and the receiving camera, central optical axes of the laser pattern projector and the receiving camera being parallel;

a control command transmitted to the depth perception module is for adjusting control parameters for pre-processing images, such that the input encoded image sequence being subjected to consistent processing after being pre-processed; and for selecting to output one group of reference encoded images in coincidence with the working range mode from among multiple groups of reference encoded images that have been solidified in the memory, the pre-processed input encoded image sequence being subjected to block-matching-based disparity computation and depth computation, thereby outputting a depth image sequence;

the multiple groups of reference encoded images refers to encoded images, in conjunction with different work range modes, each of which is projected onto a vertical plane vertical to a projector optical axis at a different distance, pre-collected, and subjected to a same image pre-processing as the input encoded images, the encoded images being pre-solidified in the memory as standard reference encoded images; the parameter $M_i$ for each working range mode corresponding to a group of reference encoded images with a distance $d_i$; wherein one group of reference encoded images may consist of one or more images;

The block-matching-based disparity computation resolves a displacement amount, i.e., disparity value, between an image block and an optimal matching block in the inputted encoded image by performing block matching similarity comparison between respective input encoded images in the pre-processed input encoded image sequence and the reference encoded images;

the depth computation: assume a focal length f of the receiving camera, a physical pixel pitch μ of the receiving camera image sensor, a baseline distance S between the laser pattern projector and the receiving camera, a displacement amount Δm resulting from the block-matching-based disparity computation, the Δm being Δx or Δy, a known distance $d_i$ corresponding to the reference encoded image, the corresponding depth value d' may be derived through an equation below for depth computation:

$$d' = d_i - \frac{\Delta m \mu d_i^2}{fS + \Delta m \mu d_i} = \frac{fSd_i}{fS + \Delta m \mu d_i}.$$

7. The apparatus according to claim 6, characterized in that:

the control module comprises an external setting unit, the external setting unit setting the parameters of the working range mode for the control module using an external microprocessor through a bus protocol.

8. The apparatus according to claim 6, characterized in that:

the control module comprises an adaptive adjustment unit that automatically detects a target object based on the generated depth image and automatically adjusts the parameters of the working range mode based on far-near change of the target object.

9. The apparatus according to claim 6, characterized in that:

the working range mode is divided into a plurality of distance intervals based on far-near distance of the target object, parameters of each working range mode corresponding to a specific distance interval.

10. The apparatus according to claim 6, characterized in that:

the adjusting a driving current of the laser pattern projector driving circuit comprises a current magnitude of a constant current driving manner by changing a resistance value of a digital localizer or a variable resistor; the farther the distance corresponding to the working range parameter is, the larger the driving current is, while the smaller its corresponding resistance value is.

11. The method according to claim 2, characterized in that:

the control module comprises an adaptive adjustment unit that automatically detects a target object based on the generated depth image and automatically adjusts the parameters of the working range mode based on far-near change of the target object.

12. The apparatus according to claim 7, characterized in that:

the control module comprises an adaptive adjustment unit that automatically detects a target object based on the generated depth image and automatically adjusts the parameters of the working range mode based on far-near change of the target object.

\* \* \* \* \*